(12) United States Patent
Sumikawa

(10) Patent No.: US 12,109,600 B2
(45) Date of Patent: Oct. 8, 2024

(54) PRESS FORMING METHOD

(71) Applicant: JFE STEEL CORPORATION, Tokyo (JP)

(72) Inventor: Satoshi Sumikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 389 days.

(21) Appl. No.: 17/602,093

(22) PCT Filed: Dec. 27, 2019

(86) PCT No.: PCT/JP2019/051362
§ 371 (c)(1),
(2) Date: Oct. 7, 2021

(87) PCT Pub. No.: WO2020/217593
PCT Pub. Date: Oct. 29, 2020

(65) Prior Publication Data
US 2022/0143672 A1    May 12, 2022

(30) Foreign Application Priority Data

Apr. 22, 2019 (JP) ................................ 2019-080657

(51) Int. Cl.
*B21D 22/26* (2006.01)
*B21D 53/88* (2006.01)
*B29C 43/02* (2006.01)

(52) U.S. Cl.
CPC ............. *B21D 22/26* (2013.01); *B21D 53/88* (2013.01); *B29C 43/02* (2013.01)

(58) Field of Classification Search
CPC ........ B21D 22/02; B21D 22/20; B21D 22/21; B21D 22/22; B21D 22/26; B21D 22/30; B21D 24/005; B21D 53/88
See application file for complete search history.

(56) References Cited

U.S. PATENT DOCUMENTS 9,962,752 B2 * 5/2018 Uchiyama .............. B21D 53/88
                                                                72/379.2
2015/0367397 A1   12/2015 Uchiyama et al.
(Continued)

FOREIGN PATENT DOCUMENTS

CN         104918725 A        9/2015
CN         107073547 A        8/2017
(Continued)

OTHER PUBLICATIONS

Apr. 13, 2022 Search Report issued in European Patent Application No. 19926276.7.
(Continued)

*Primary Examiner* — Debra M Sullivan
*Assistant Examiner* — Matthew Stephens
(74) *Attorney, Agent, or Firm* — Oliff PLC

(57) ABSTRACT

A press forming method forms a press-formed product having a hat-shaped cross section and includes: a first forming process of press-forming a preformed part in which a portion corresponding to web corresponding to a web portion, and a portion corresponding to side wall corresponding to a side wall portion and including a twisted side wall portion of a twisted shape along the longitudinal direction, are formed, the preformed part including a portion corresponding to convex curve corresponding to a convex curved portion; and a second forming process of press-forming the preformed part into the press-formed product. The twisted side wall portion at the first forming process is twisted such that an angle between the twisted side wall portion and the portion corresponding to web is larger on an end portion side than at a center of the portion corresponding to convex curve in the longitudinal direction.

2 Claims, 17 Drawing Sheets

(56) References Cited

U.S. PATENT DOCUMENTS

| | | | |
|---|---|---|---|
| 2017/0266706 A1* | 9/2017 | Ito .......................... | B21D 53/88 72/379.2 |
| 2017/0291208 A1 | 10/2017 | Nishimura et al. | |
| 2018/0304341 A1* | 10/2018 | Frost ...................... | B21D 22/26 72/379.2 |
| 2019/0030583 A1* | 1/2019 | Nishimura ............. | B21D 5/002 72/379.2 |
| 2020/0038931 A1* | 2/2020 | Miyagi ................... | B21D 5/01 72/379.2 |
| 2021/0114076 A1 | 4/2021 | Miyake et al. | |
| 2021/0260640 A1 | 8/2021 | Fujii et al. | |

FOREIGN PATENT DOCUMENTS

| | | |
|---|---|---|
| CN | 107835722 A | 3/2018 |
| CN | 108883455 A | 11/2018 |
| CN | 111727089 A | 9/2020 |
| CN | 112334244 A | 2/2021 |
| EP | 3437751 A1 | 2/2019 |
| EP | 3760331 A1 | 1/2021 |
| EP | 3819037 A1 | 5/2021 |
| JP | 2010-115674 A | 5/2010 |
| JP | 2011-206789 A | 10/2011 |
| JP | 5168429 B2 | 3/2013 |
| JP | 5733475 B2 | 6/2015 |
| JP | 5965159 B2 | 8/2016 |
| JP | 2018-020349 A | 2/2018 |
| WO | 2017/010470 A1 | 1/2017 |

OTHER PUBLICATIONS

Mar. 10, 2020 International Search Report issued in International Patent Application No. PCT/JP2019/051362.
Jan. 18, 2023 Office Action issued in Chinese Patent Application No. 201980095587.X.

* cited by examiner (a-1)

(a-2)

(b)

LONGITUDINAL DIRECTION

PRESS FORMING METHOD

FIELD

The present invention relates to a press forming method, and in particular to a press forming method for a press-formed product that has a hat-shaped cross section with a web portion, side wall portions, and flange portions, and that is convexly curved in the height direction along the longitudinal direction in side view.

BACKGROUND

Press forming is a method of processing a metal sheet, such as a steel sheet, by clamping the metal sheet with a die of press forming and transferring the shape of the die. In particular, many automotive parts are manufactured by press forming. Nowadays, there has been a strong tendency to use high-strength steel sheets for body parts in view of weight reduction of automotive bodies. However, as the strength as a property of steel sheets and other metal materials increases, elongation tends to decrease, and forming defects such as fractures and wrinkles often occur in the press forming of high-strength steel sheets, causing problems.

Among the frame parts of an automotive body, curved parts having a steeply curved shape, such as front side members and rear side members, tend to have fractures and wrinkles when manufactured by press forming. These members are thus considered to be parts difficult to form. Recently, automobile and parts manufacturers have been studying the application of high-strength steel sheets in the manufacture of such curved parts in order to further reduce the weight of automotive bodies, and an issue is how to perform press forming while preventing fractures and wrinkles.

Several techniques have been developed for press forming of curved parts while suppressing fractures and wrinkles. For example, Patent Literature 1 discloses a technique for avoiding wrinkles in a punch bottom and fractures in a flange in press forming of an L-shaped part that is curved in top view, by using a forming load to form the flange and a side wall and sliding the material at the punch bottom.

Patent Literature 2 provides a method of preventing out-of-plane deformation and suppressing wrinkles of parts that are curved in the vertical direction by performing drawing forming while applying pressure to the punch bottom of a blank in the thickness direction with a pad.

Patent Literature 3 discloses a technique for suppressing the occurrence of wrinkles in a flange portion in press forming of a curved press part with a hat-shaped cross section curved in the longitudinal direction, by preforming a folding portion at an end portion of a blank material in the width direction and then press-forming the curved press part while leaving the folding portion. It is described that, with this technique, the stiffness of the end portion of the blank material in the width direction increases due to the folding portion added to the end portion of the blank material in the preforming process, and the resistance against force of shrinking the blank in the longitudinal direction increases, and thus the occurrence of wrinkles in the flange portion can be suppressed even when the force of shrinking the blank in the longitudinal direction is applied due to excess metal resulted from the curved shape.

In addition, several techniques have been developed to press-form a curved part by adding a bead, with the aim of suppressing the occurrence of fractures and wrinkles. Patent Literature 4 discloses a technique for suppressing the occurrence of wrinkles in a material formed section when press-forming, in one process, a material into a shape that has a curvature when an end portion of the material is viewed in plan view and that has a flange surface below a side wall surface in side view, by adding a convex bead to the side wall surface and a concave bead to the flange surface directly below the concave bead.

CITATION LIST

Patent Literature

Patent Literature 1: Japanese Patent No. 5168429
Patent Literature 2: Japanese Patent No. 5733475
Patent Literature 3: Japanese Patent No. 5965159
Patent Literature 4: Japanese Patent Application Laid-open No. 2010-115674

SUMMARY

Technical Problem

However, the technique disclosed in Patent Literature 1 has limited applicability to parts that have a shape such as a mounted surface at the punch bottom or that have a closed shape such as a bag shape, because the material cannot be moved significantly.

In the technique disclosed in Patent Literature 2, a blank holder and pad are used at the same time for forming, and when a formed product is removed from a die, if the blank holder or pad remains under pressure, it will crush the formed product. Thus, a locking structure is necessary to stop movement. However, since press machines equipped with this mechanism are not common, the technique lacks versatility.

In the technique disclosed in Patent Literature 3, the bending shape of the flange portion needs to be flattened in the next process, but there is a risk that curling may remain. Particularly in the case of automotive parts, a flange is often a surface for joining with another part, and high surface accuracy is required. Thus, care needs to be taken in applying this forming method.

The technique disclosed in Patent Literature 4 is press forming in one process, and has the problem that the bead added to prevent wrinkle occurrence and fracturing remains as it is.

The present invention has been made in order to solve the above problems, and an object of the present invention is to provide a press forming method that can press-form, into a favorable shape, a press-formed product that has a hat-shaped cross section with a web portion, side wall portions, and flange portions, and that is convexly curved in the height direction along the longitudinal direction, while suppressing fractures and wrinkles.

Solution to Problem

A press forming method according to the present invention forms a press-formed product having a hat-shaped cross section and including: a web portion; a side wall portion continuous from the web portion; a flange portion continuous from the side wall portion; and a convex curved portion in which the web portion and/or the flange portion is convexly curved in a height direction along a longitudinal direction in side view, and includes: a first forming process of press-forming a preformed part in which a portion corresponding to web corresponding to the web portion, and a portion corresponding to side wall corresponding to the side wall portion and including a twisted side wall portion of a twisted shape along the longitudinal direction, are formed, the preformed part including a portion corresponding to convex curve corresponding to the convex curved portion; and a second forming process of press-forming the preformed part into the press-formed product, wherein the twisted side wall portion at the first forming process is twisted such that an angle between the twisted side wall portion and the portion corresponding to web is larger on an end portion side than at a center of the portion corresponding to convex curve in the longitudinal direction.

The twisted side wall portion at the first forming process may have a torsion amount T given by a following equation, the torsion amount T being set to be in a range of 10° or larger and 20° or smaller:

$$T = \Delta\theta \times (H/L),$$

where $\Delta\theta$: an angle difference (=$\theta_2 - \theta_1$), $\theta_1$: an angle (°) between the twisted side wall portion and the portion corresponding to web at the center of the portion corresponding to convex curve in the longitudinal direction, $\theta_2$: an angle (°) between the twisted side wall portion and the portion corresponding to web at an end portion of the twisted side wall portion in the longitudinal direction, H: a side wall height (mm) of the twisted side wall portion, and L: a longitudinal length (mm) of the twisted side wall portion.

Advantageous Effects of Invention

According to the present invention, shear deformation can be generated in the twisted side wall portion, and the occurrence of fractures and wrinkles is suppressed, enabling the press-formed product to be press-formed into a favorable shape.

DESCRIPTION OF EMBODIMENTS

Before explaining a press forming method according to an embodiment of the present invention, the following explains a press-formed product to be formed in the present invention, the reason that fractures and wrinkles occur when the press-formed product is press-formed, and the background that led to the present invention. In the present embodiment, the height direction of the press-formed product coincides with the press-forming direction of the press-formed product.

<Press-Formed Product>

Figure 2:
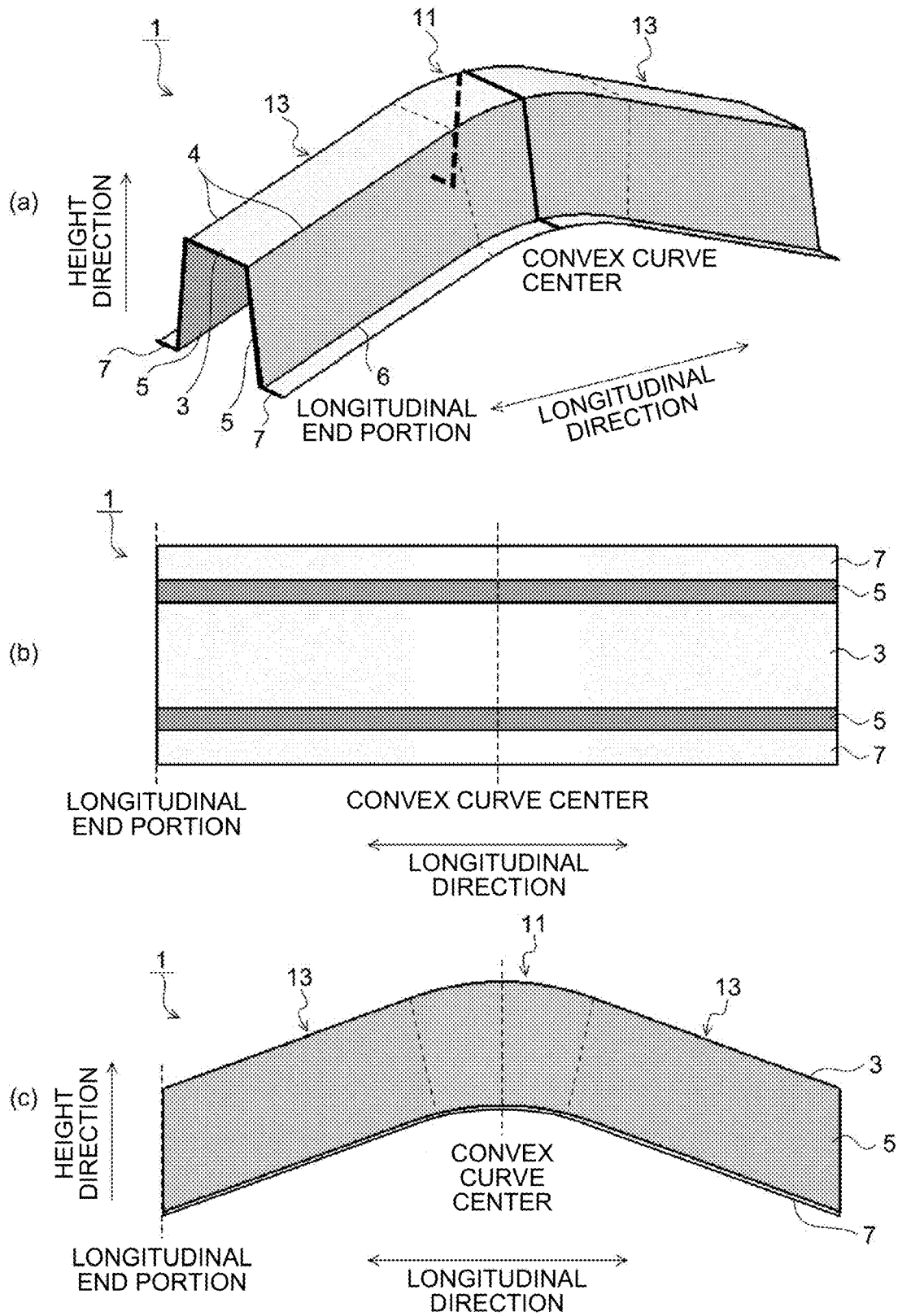
FIG. 2 illustrates the press-formed product to be formed in the present invention ((a) perspective view, (b) top view, (c) side view).
Figure 3:
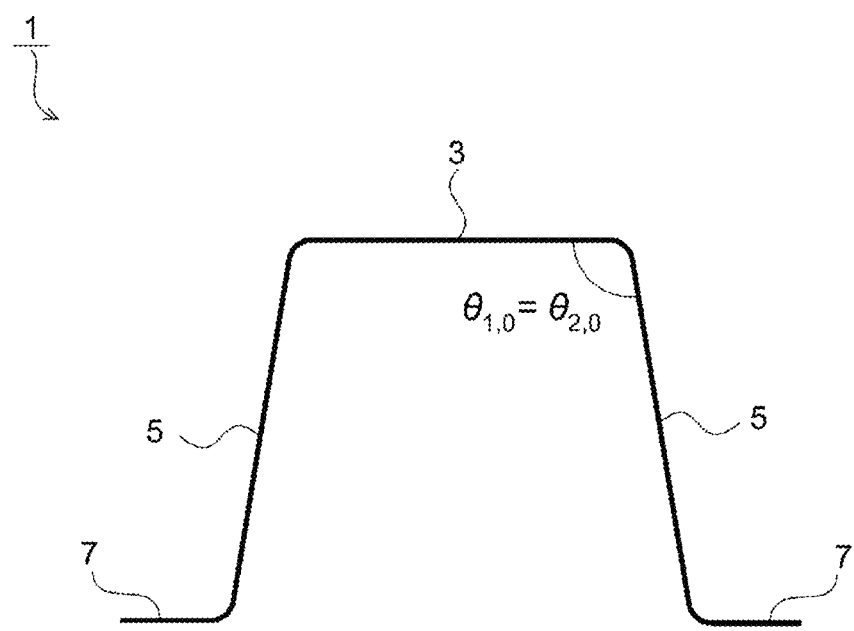
FIG. 3 illustrates a sectional view of the press-formed product to be formed in the present invention, the section being perpendicular to the longitudinal direction.

As illustrated in FIGS. 2 and 3 as an example, a press-formed product 1 to be formed in the present invention has a hat-shaped cross section with a web portion 3, side wall portions 5 continuous from the web portion 3, and flange portions 7 continuous from the respective side wall portions 5, and includes a convex curved portion 11 in which the web portion 3 and the flange portions 7 are convexly curved in the height direction along the longitudinal direction in side view (FIG. 2(c)). Straight portions 13 extending in a straight shape are provided on both sides of the convex curved portion 11 in the longitudinal direction. Here, the convex curved portion 11 being convexly curved in the height direction along the longitudinal direction means that the center of the convexly curved arc is located on the flange portion 7 side in side view.

Figure 4:
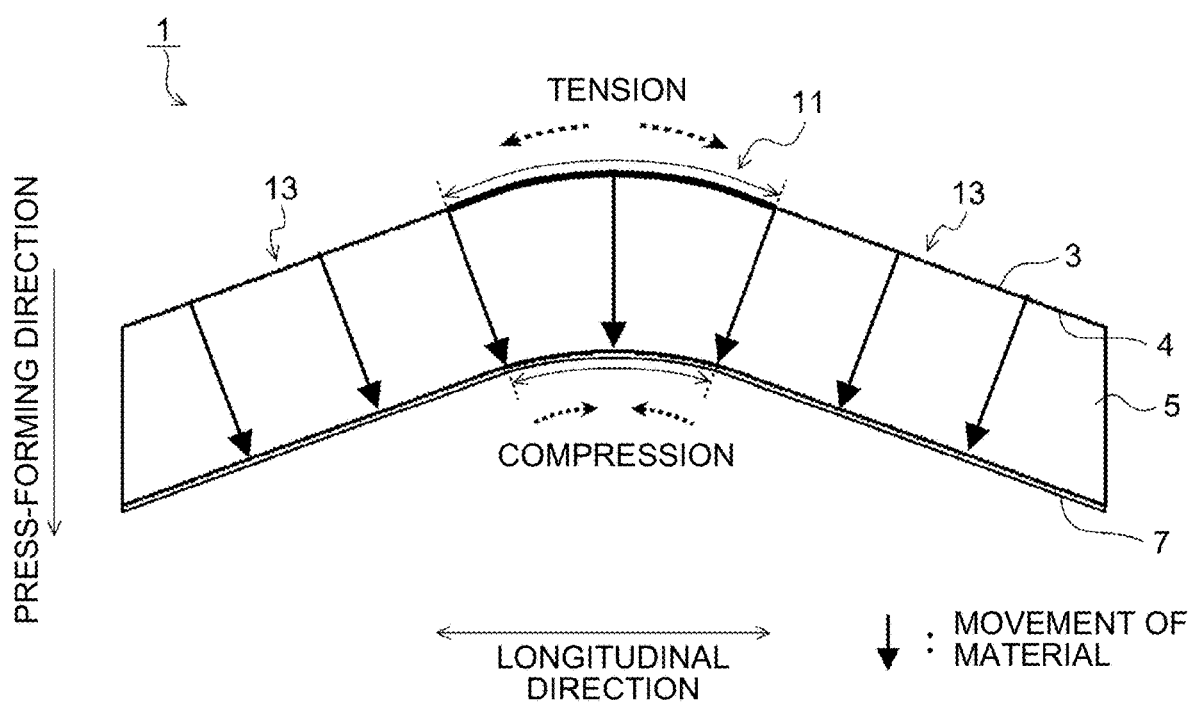
FIG. 4 illustrates the movement of a material when the press-formed product to be formed in the present invention is press-formed by a conventional press forming method, and the areas where tensile deformation and compressive deformation occur in the press-formed product.

FIG. 4 illustrates the movement of a material during press forming when the press-formed product 1 is viewed in side view. In a process of press forming a blank (metal sheet), the blank is bent at a punch corner portion 4 between the web portion 3 and each of the side wall portions 5, and the material moves in a direction (direction of the arrows in FIG. 4) orthogonal to the ridgeline of the punch corner portion 4.

Thus, in the convex curved portion 11, the longitudinal length of the web portion 3 becomes longer while the longitudinal length of each of the flange portions 7 becomes shorter due to the concentration of the material, resulting in a line length difference in the longitudinal direction between the web portion 3 and the flange portion 7. As a result, tensile deformation acts on the web portion 3, causing it to fracture easily, and compressive deformation acts on the flange portion 7, causing it to wrinkle easily.

Therefore, in order to suppress the occurrence of fractures and wrinkles during press forming of the press-formed product 1, it is considered important to change the movement of the material during the press forming process so that tensile and compressive deformations do not occur in the web portion 3 or the flange portion 7 in the convex curved portion 11, thereby reducing the line length difference in the longitudinal direction between the web portion 3 and the flange portion 7.

Figure 5:
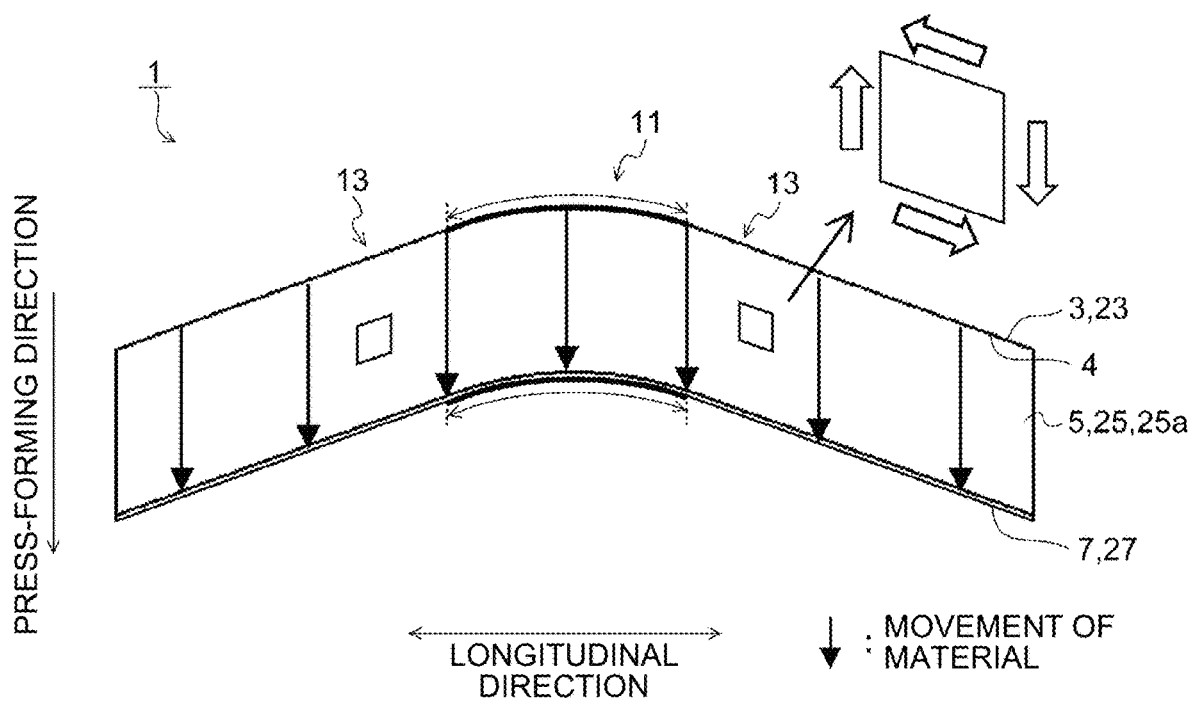
FIG. 5 illustrates the movement of the material when a side wall portion is press-formed with shear deformation generated in the process that led to the present invention.

Thus, consider the ideal state of press forming that does not cause a line length difference in the longitudinal direction between the web portion 3 and the flange portion 7 in the convex curved portion 11. FIG. 5 illustrates the movement of the material in the ideal state. In order to avoid a line length difference in the longitudinal direction between the web portion 3 and the flange portion 7, as illustrated in FIG. 5, it is necessary to generate shear deformation in the blank at a portion corresponding to the side wall portion 5 (hereinafter referred to as a "portion corresponding to side wall") to move the material in the same direction as the press-forming direction. However, in press forming, a die basically moves only in the vertical direction, and it is not easy to generate in-plane shear deformation in the material at the portion corresponding to side wall by this limited movement of the die.

The inventors have studied a method to induce in-plane shear deformation in the material. As a result, it has been found that in-plane shear deformation can be generated in the portion corresponding to side wall of the blank by press-forming it into a curved surface shape with an out-of-plane twist along the longitudinal direction. The present invention has been made based on such studies, and the press forming method according to the embodiment of the present invention is described below.

<Press Forming Method>

Figure 1:
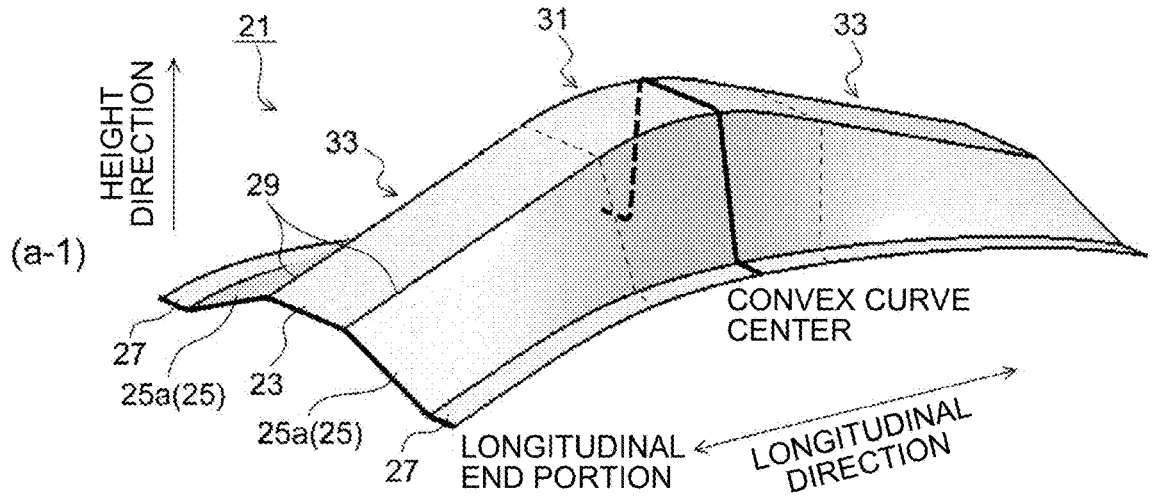
FIG. 1 illustrates a preformed part and a press-formed product having a target shape that are press-formed by a press forming method according to an embodiment of the present invention ((a-1) perspective view of the preformed part, (a-2) view illustrating a section of the center of a convex curved portion and a section of an end portion of the preformed part in the longitudinal direction in an overlapping manner, (b) perspective view of the press-formed product).
Figure 1:
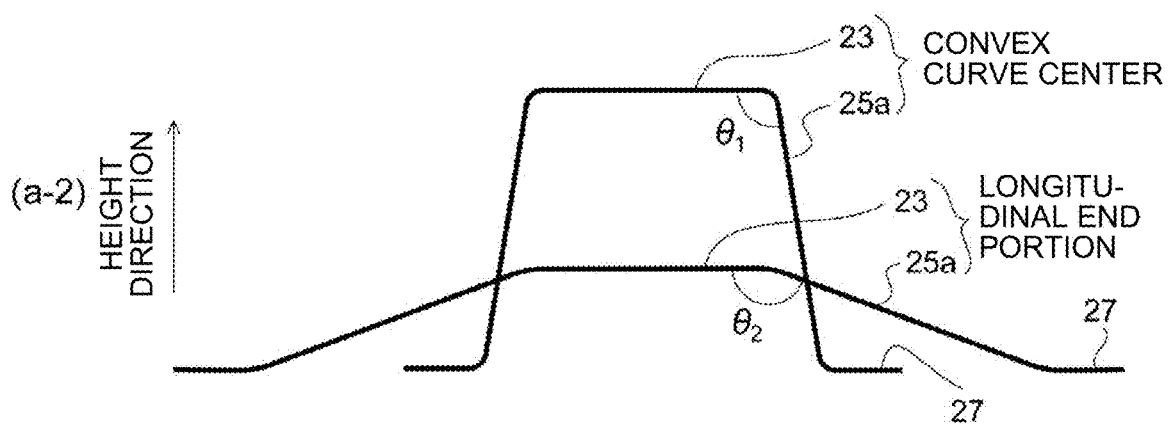
Figure 1:
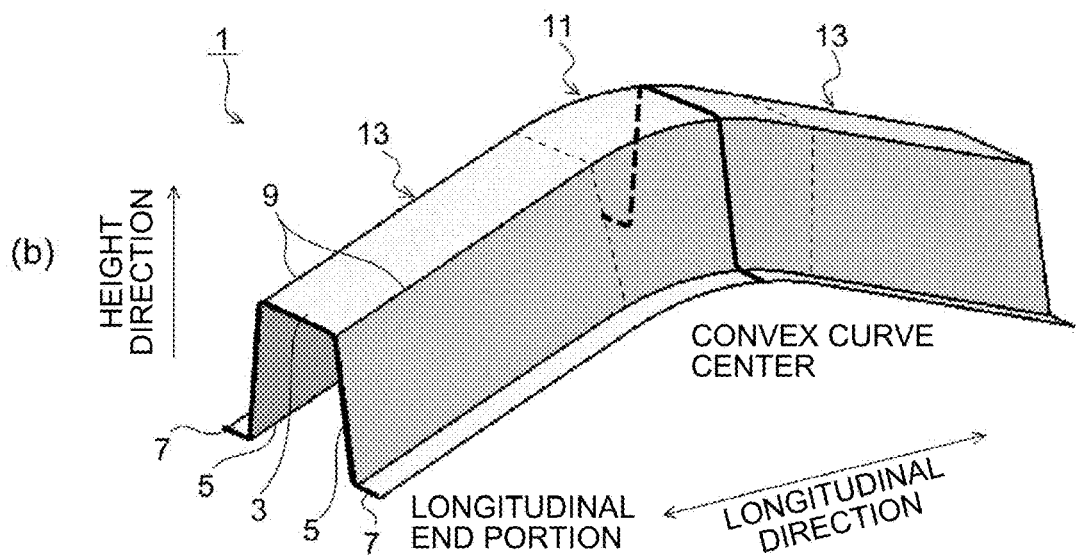

The press forming method according to the present embodiment is to press-form the press-formed product 1 illustrated in FIG. 1(b) and FIG. 2 as a target shape, and includes a first forming process to preform a blank into a preformed part 21 (FIGS. 1(a-1) and 1(a-2)), and a second forming process to press-form the preformed part 21 into the press-formed product 1 having the target shape. Note that the blank used for the press forming method according to the present invention is not limited to a steel sheet and may be a sheet made of a plastic material such as an aluminum alloy sheet, a magnesium alloy sheet, a titanium alloy sheet, and a plastic sheet, for example. In addition, the material strength of the blank is not specifically limited.

《First Forming Process》

The first forming process is a process to preform the blank into the preformed part 21 (FIGS. 1(a-1) and 1(a-2)).

As illustrated in FIG. 1(a-1), the preformed part 21 has a hat-shaped cross section with a portion 23 corresponding to web corresponding to the web portion 3 of the press-formed product 1, portions 25 corresponding to side wall corresponding to the side wall portions 5 of the press-formed product 1 and including respective twisted side wall portions 25a of a curved surface shape twisted along the longitudinal direction compared with the side wall portion 5, and portions 27 corresponding to flange corresponding to the flange portions 7 of the press-formed product 1, and includes a portion 31 corresponding to convex curve corresponding to the convex curved portion 11 of the press-formed product 1, and portions 33 corresponding to straight portion corresponding to the straight portions 13.

In the preformed part 21, the twisted side wall portions 25a are formed over the entire length of the portions 25 corresponding to side wall in the longitudinal direction. FIG. 1(a-2) illustrates the shapes of the sections of the preformed part 21, the sections being orthogonal to the longitudinal direction of the preformed part 21, at the center of the portion 31 corresponding to convex curve in the longitudinal direction (hereinafter referred to as a "convex curve center") and at an end portion of the twisted side wall portion 25a in the longitudinal direction (hereinafter referred to as a "longitudinal end portion"). The shapes of the sections illustrated in FIG. 1(a-2) are depicted with the positions of the portions 27 corresponding to flange in the height direction aligned with each other for convenience of explanation.

Each of the twisted side wall portions 25a is twisted such that an angle $\theta_2$ at the longitudinal end portion is larger than an angle $\theta_1$ at the convex curve center where an angle between the twisted side wall portion 25a and the portion 23 corresponding to web is θ, as illustrated in FIG. 1(a-2). With this twisting, the angle θ between the twisted side wall portion 25a and the portion 23 corresponding to web changes continuously along the longitudinal direction.

In the present embodiment, the portion 23 corresponding to web of the preformed part 21 has the same shape as that of the web portion 3 (FIG. 2) of the press-formed product 1, as illustrated in FIG. 1. In contrast, each of the portions 27 corresponding to flange of the preformed part 21 is continuous with the portion 25 corresponding to side wall including the twisted side wall portion 25a, which has a different shape from that of the side wall portion 5, as illustrated in FIG. 1. Thus, the portion 27 corresponding to flange has a different shape in plan view and side view from that of the flange portion 7 of the press-formed product 1 (FIGS. 2(b) and 2(c)), as illustrated in FIGS. 6(b) and 6(c).

The angle between the portion 23 corresponding to web and the twisted side wall portion 25a of the preformed part 21 is larger at the longitudinal end portion ($\theta_2$) than at the convex curve center ($\theta_1$) (refer to FIG. 1(a-2)). As a result, the formed height of the preformed part 21 in the height direction is not constant along the longitudinal direction and differs from the formed height of the press-formed product 1 in the height direction.

Furthermore, the ridgeline length of a punch corner portion 24 (FIG. 6) between the portion 23 corresponding to web and each of the portions 25 corresponding to side wall of the preformed part 21 is different from the ridgeline length of the punch corner portion 4 (FIG. 2) of the press-formed product 1, or the ridgeline length of a die corner portion 26 (FIG. 6) between the portion 25 corresponding to side wall and each of the portions 27 corresponding to flange is different from the ridgeline length of a die corner portion 6 (FIG. 2) of the press-formed product 1.

For example, if the portion 23 corresponding to web is formed into the same shape as that of the web portion 3 of the press-formed product 1 having the target shape, the ridgeline length of the punch corner portion 24 is the same as that of the press-formed product 1, but the ridgeline length of the die corner portion 26 is different from that of the press-formed product 1. If the portion 27 corresponding to flange is formed into the same shape as that of the flange portion 7 of the press-formed product 1 having the target shape, the ridgeline length of the die corner portion 26 is the same as that of the press-formed product 1, but the ridgeline length of the punch corner portion 24 is different from that of the press-formed product 1.

«Second Forming Process»

The second forming process is a process to press-form the preformed part 21 (FIGS. 1(a-1) and 1(a-2)) into the press-formed product 1 having the target shape (FIG. 1(b)). By the second forming process, the portion 25 corresponding to side wall, including the twisted side wall portion 25a having the angle between the twisted side wall portion 25a and the portion 23 corresponding to web changing along the longitudinal direction, is formed into the side wall portion 5 of the target shape. Furthermore, the portion 27 corresponding to flange is formed into the flange portion 7 of the target shape.

«Reason that Fractures and Wrinkles can be Suppressed»

Next, the following explains the reason that the press forming method according to the present embodiment can press-form a press-formed product that is convexly curved in the height direction along the longitudinal direction in side view, while suppressing fractures and wrinkles.

At the first forming process, as illustrated in FIG. 1, each of the twisted side wall portions 25a with a curved surface shape with an out-of-plane twist along the longitudinal direction are formed on the portion 25 corresponding to side wall corresponding to the side wall portion 5 of the press-formed product 1. When the material (blank) is formed into a curved surface shape with an out-of-plane twist, the material undergoes in-plane shear deformation in addition to out-of-plane shear deformation, as illustrated in FIG. 7.

This configuration suppresses the movement of the material toward the center of the portion 27 corresponding to flange in the longitudinal direction in the portion 31 corresponding to convex curve, and also suppresses the movement of the material toward the end portion side in the longitudinal direction in the portion 23 corresponding to web. Thus, in the twisted side wall portion 25a, the line length difference between the line length of the portion 23 corresponding to web in the longitudinal direction and the line length of the portion 27 corresponding to flange in the longitudinal direction is reduced, as illustrated in FIG. 5. As a result, fractures in the web portion 3 and wrinkles in the flange portion 7 are suppressed in the press-formed product 1, which is obtained by press-forming the preformed part 21 into the target shape at the second forming process.

«Suitable Range of Torsion Amount of Twisted Side Wall Portion»

Figure 7:
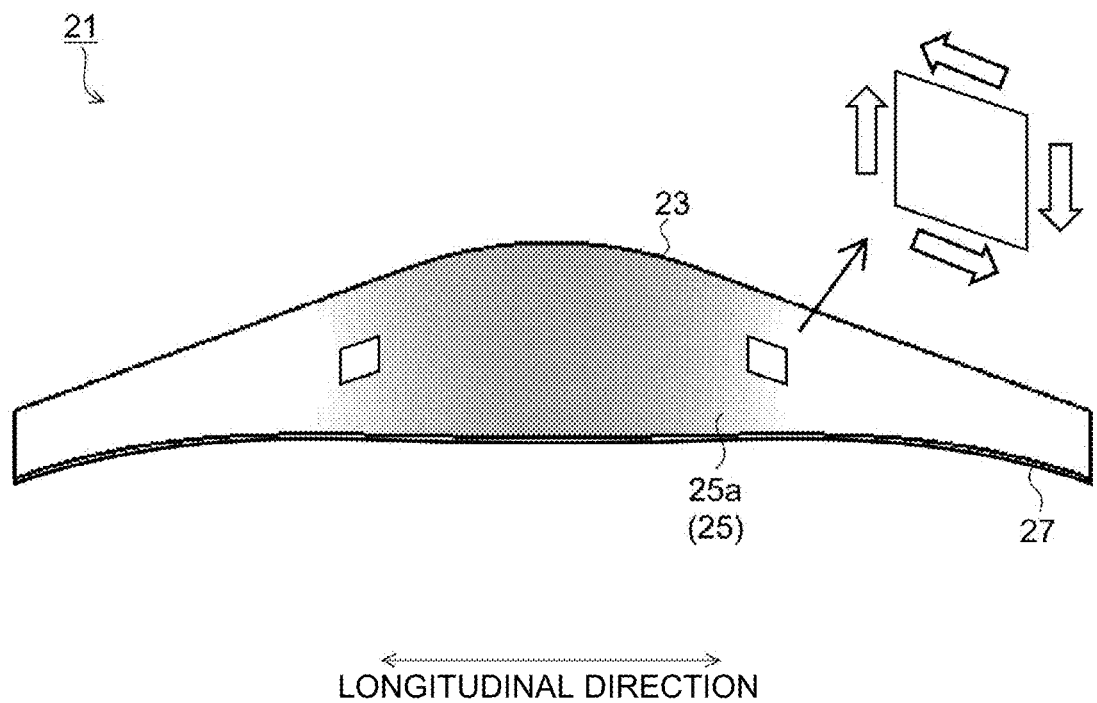
FIG. 7 illustrates in-plane shear deformation at a twisted side wall portion of the preformed part that is press-formed by the press forming method according to the embodiment of the present invention.

As illustrated in FIG. 7 described above, the press forming method according to the present invention suppresses fractures in the web portion 3 and wrinkles in the flange portion 7 of the press-formed product 1 (FIG. 2) having the target shape, by causing in-plane shear deformation in the twisted side wall portion 25a at the first forming process.

Here, the magnitude of in-plane shear deformation in the twisted side wall portion 25a depends on the degree of torsion of the twisted side wall portion 25a. In the present invention, the degree of torsion of the twisted side wall portion 25a can be expressed using an angle change and an aspect ratio of the twisted side wall portion 25a.

The angle change of the twisted side wall portion 25a is given by the angle difference $\Delta\theta$ between the angle $\theta_1$ at the convex curve center (the center of the portion 31 corresponding to convex curve in the longitudinal direction) and the angle $\theta_2$ at the longitudinal end portion (the end portion of the twisted side wall portion 25a in the longitudinal direction), which are the angles between the twisted side wall portion 25a and the portion 23 corresponding to web (refer to FIG. 1(a-2)).

Figure 8:
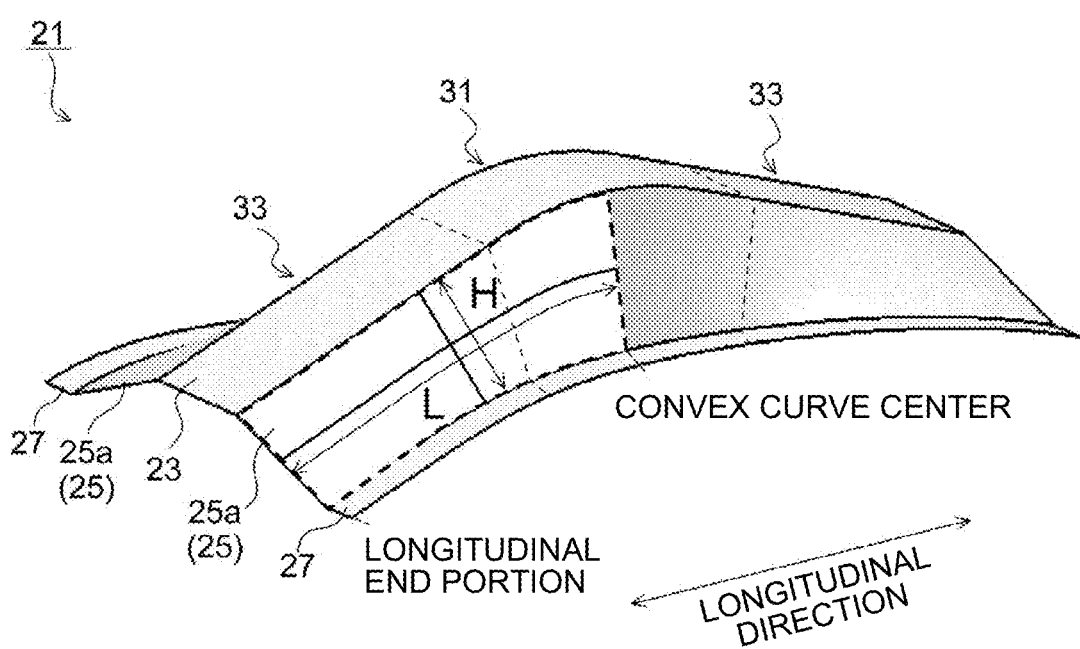
FIG. 8 illustrates a side wall height and a longitudinal length that give a torsion amount of the twisted side wall portion of the preformed part that is press-formed by the press forming method according to the embodiment of the present invention.

The aspect ratio of the twisted side wall portion 25a is given by a ratio H/L, which is the ratio of a side wall height H to a longitudinal length L of the twisted side wall portion 25a, as illustrated in FIG. 8. Here, the side wall height H and the longitudinal length L of the twisted side wall portion are the height in the direction orthogonal to the longitudinal direction and the length in the longitudinal direction, both in the plane of the twisted side wall portion 25a.

The torsion amount T (°) is then given by the following Equation (1).

$$T = \Delta\theta \times (H/L) = (\theta_2 - \theta_1) \times (H/L) \qquad (1)$$

It is understood from Equation (1) that the torsion amount T can be changed by changing (1) the angle $\theta_1$ between the twisted side wall portion 25a and the portion 23 corresponding to web at the convex curve center, (2) the angle $\theta_2$ between the twisted side wall portion 25a and the portion 23 corresponding to web at the longitudinal end portion, (3) the side wall height H of the twisted side wall portion 25a, and (4) the longitudinal length L of the twisted side wall portion 25a.

Figure 9:
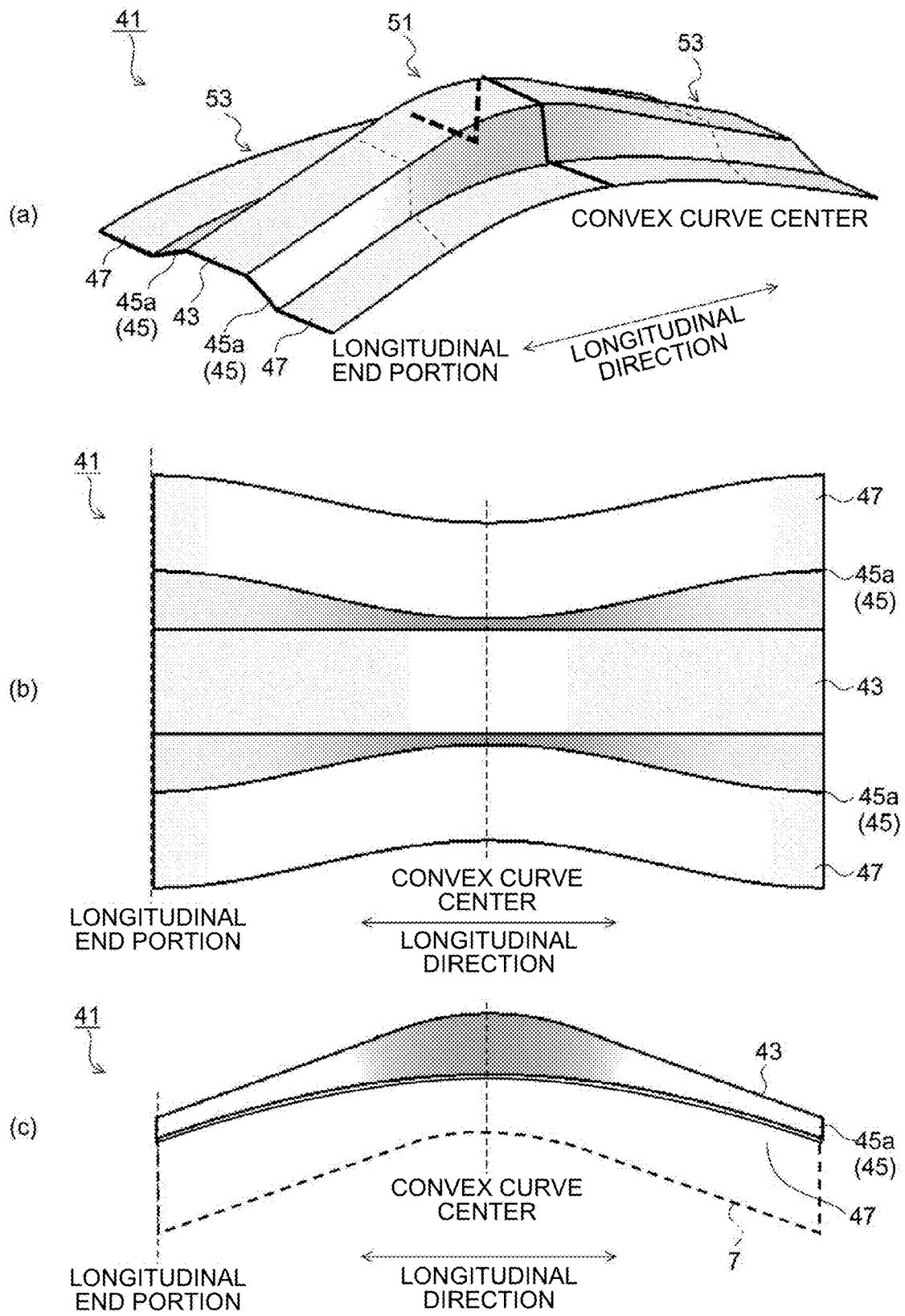
FIG. 9 illustrates a case of changing the side wall height of the twisted side wall portion of the preformed part that is press-formed by the press forming method according to the embodiment of the present invention ((a) perspective view, (b) top view, (c) side view).
Figure 10:
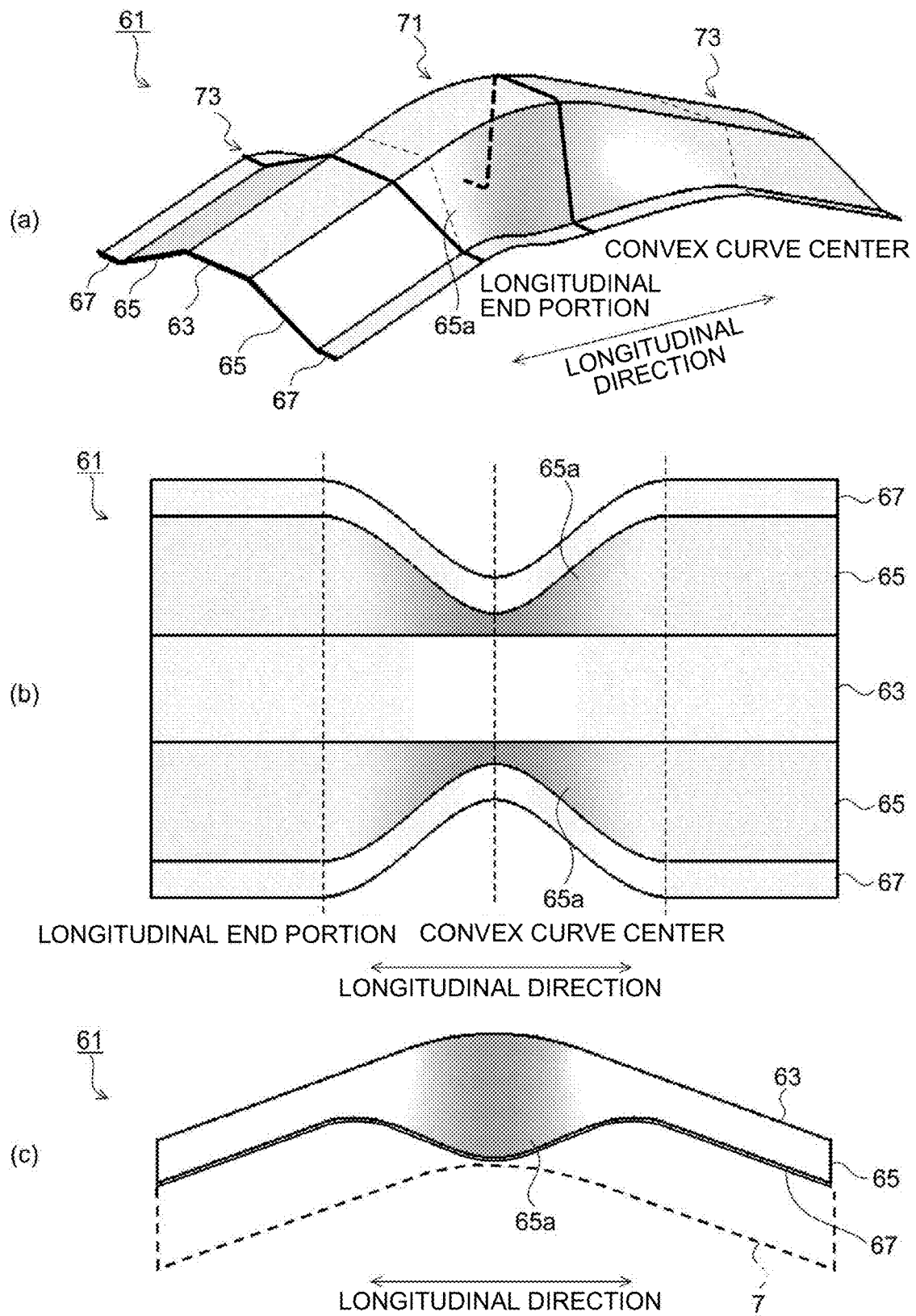
FIG. 10 illustrates a case of changing the longitudinal length of the twisted side wall portion of the preformed part that is press-formed by the press forming method according to the embodiment of the present invention ((a) perspective view, (b) top view, (c) side view).

FIG. 9 illustrates an example of a preformed part 41 in which the height H of the twisted side wall portion 25a is changed, and FIG. 10 illustrates an example of a preformed part 61 in which the longitudinal length L of the twisted side wall portion 25a is changed.

Figure 6:
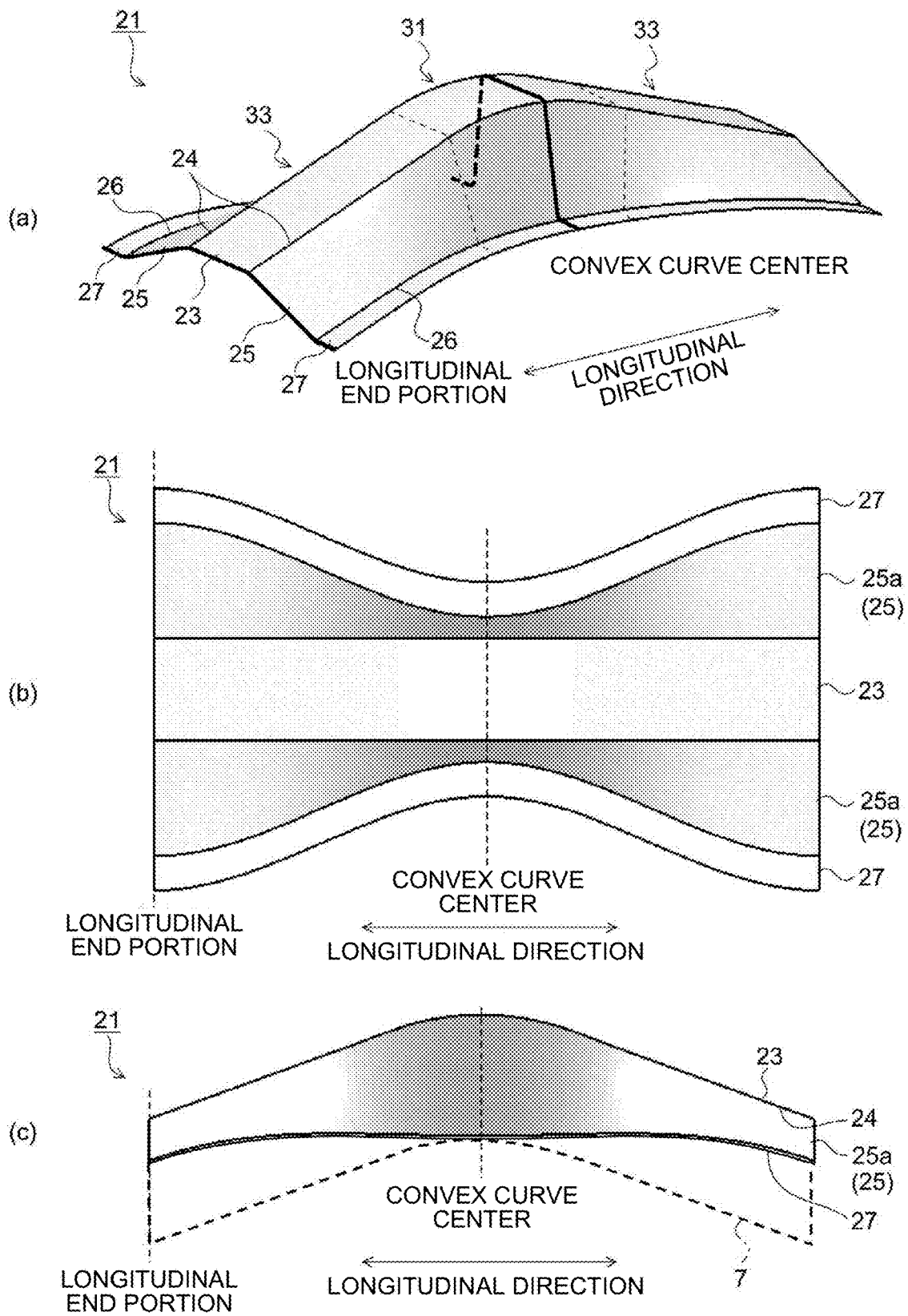
FIG. 6 illustrates the preformed part that is press-formed at a first forming process of the press forming method according to the embodiment of the present invention ((a) perspective view, (b) top view, (c) side view).

The preformed part 21 illustrated in FIGS. 1 and 6 described above includes the twisted side wall portion 25a formed over the entire length of the preformed part 21 in the longitudinal direction. On the other hand, the preformed part 61 illustrated in FIG. 10 includes twisted side wall portions 65a each having a longitudinal length L shorter than the longitudinal length of the side wall portion 5 of the press-formed product 1. In the preformed part 61, the angle $\theta_2$ between the twisted side wall portion 65a and a portion 63 corresponding to web at an end portion in the longitudinal direction is not an angle at an end portion of the entire preformed part 61 in the longitudinal direction, but an angle at an end portion of only the twisted side wall portion 65a in the longitudinal direction.

Figure 11:
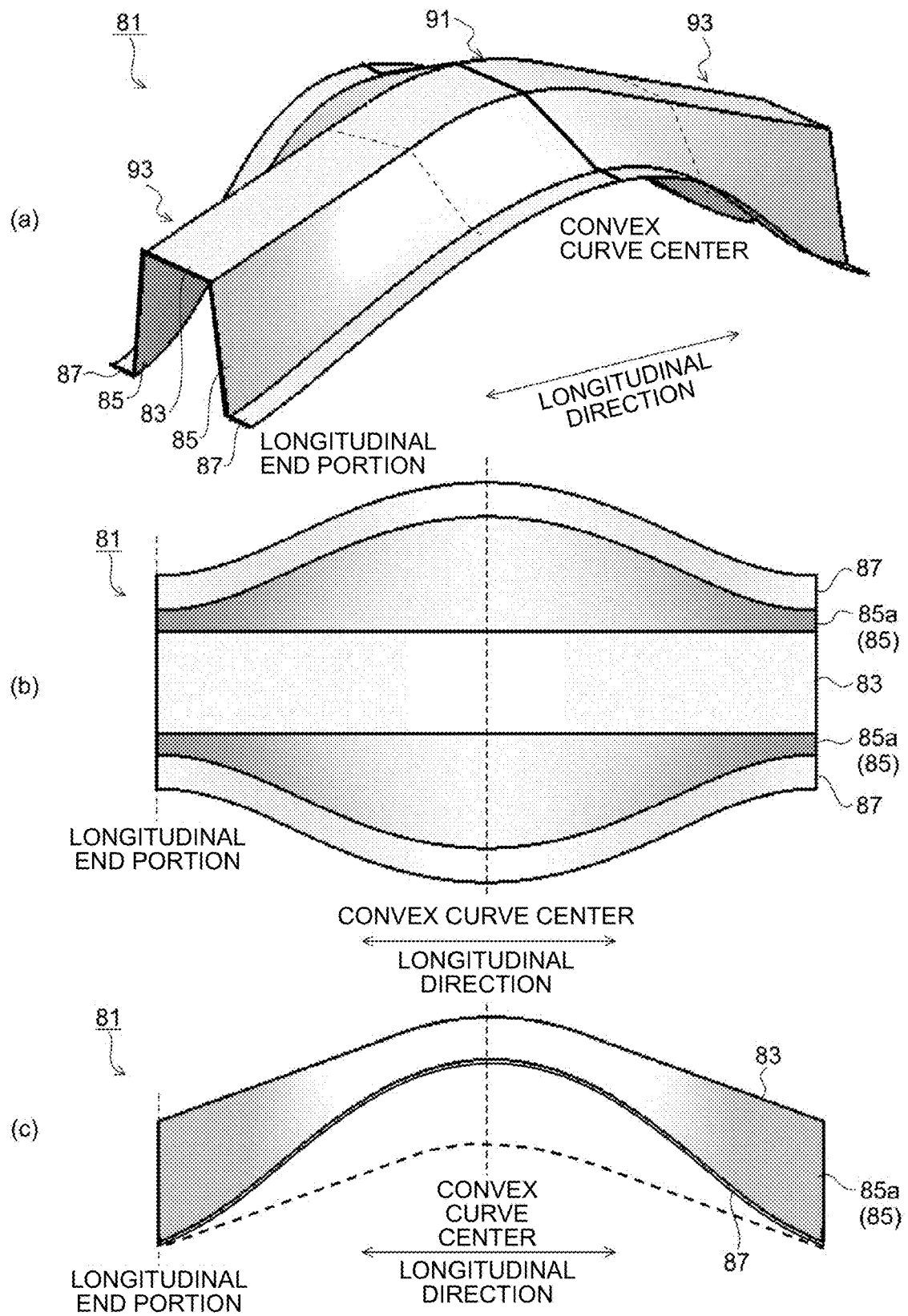
FIG. 11 illustrates a preformed part having a twisted side wall portion of a curved surface shape twisted in the opposite direction to the twisted side wall portion of the preformed part that is press-formed by the press forming method according to the embodiment of the present invention ((a) perspective view, (b) top view, (c) side view).
Figure 12:
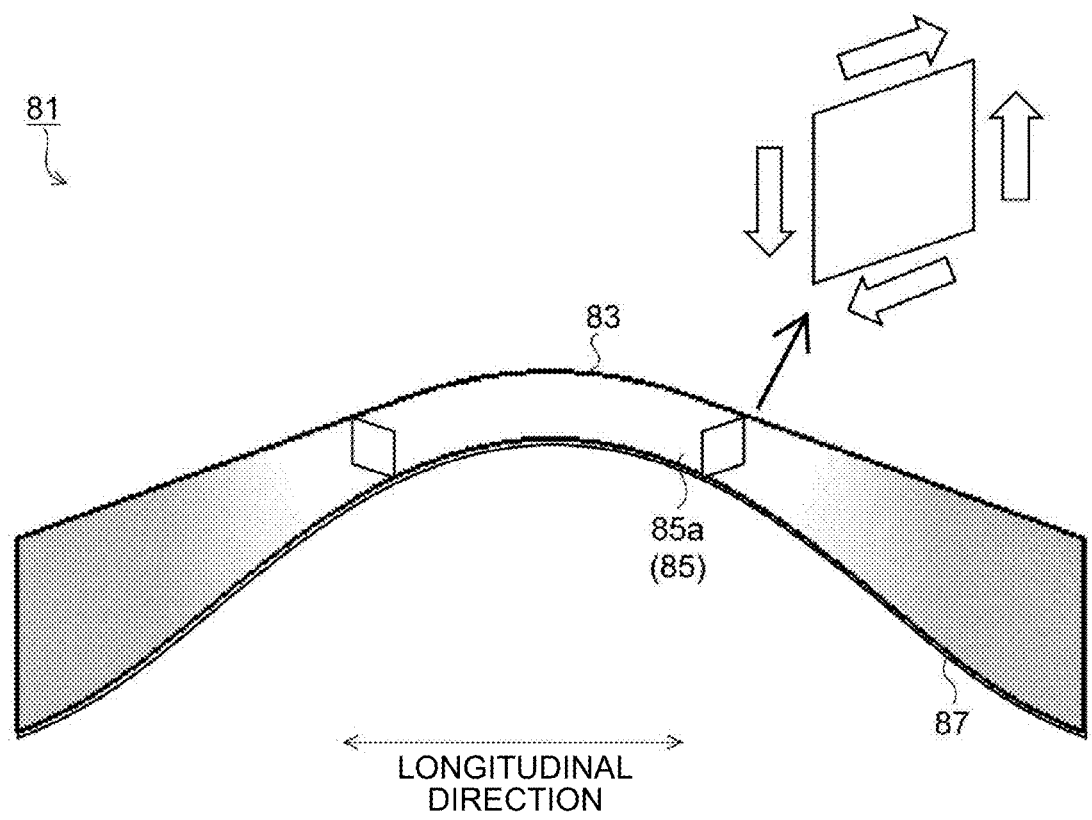
FIG. 12 illustrates the in-plane shear deformation in the twisted side wall portion twisted in the opposite direction to the twisted side wall portion of the preformed part that is press-formed by the press forming method according to the embodiment of the present invention.

Regarding the angle between the twisted side wall portion 25a and the portion 23 corresponding to web of the preformed part 21 press-formed at the first forming process, the angle $\theta_2$ at the longitudinal end portion needs to be larger than the angle $\theta_1$ at the convex curve center, as described above. For example, if the angle $\theta_2$ at the longitudinal end portion is smaller than the angle $\theta_1$ at the convex curve center as illustrated in FIG. 11, the in-plane shear deformation in the twisted side wall portion 85a will be in the opposite direction to that in the twisted side wall portion 25a illustrated in FIG. 7, as illustrated in FIG. 12. Thus, when a preformed part 81 is press-formed into the press-formed product 1 having the target shape, the line length difference in the longitudinal direction between the web portion 3 and the flange portion 7 cannot be reduced, and the effect of suppressing fractures and wrinkles cannot be obtained.

In addition, the torsion amount T suitable for suppressing fractures and wrinkles was investigated by finite element method (FEM) simulation. As a result, it was found that setting the torsion amount T to be in the range of 10° or larger and 20° or smaller is desirable to suppress both fractures and wrinkles. When the torsion amount T is smaller than 10°, the in-plane shear deformation of the twisted side wall portion 25a may be insufficient. When the torsion amount T is larger than 20°, the twisted side wall portion 25a may undergo excessive shear deformation at the first forming process, resulting in wrinkles by shear deformation in the portion corresponding to side wall.

The aspect ratio H/L of the twisted side wall portion 25a may be given by using the side wall height H at the center of the longitudinal length (a middle position between the convex curve center and the longitudinal end portion) and the longitudinal length L at the center in the side wall height direction, of the twisted side wall portion 25a.

«Shapes of Preformed Part and Press-formed Product»

In the above explanation, the preformed part 21 (FIGS. 1 and 6), the preformed part 41 (FIG. 9), and the preformed part 61 (FIG. 10) each have the portion corresponding to web having the same shape as that of the web portion of the target shape, and have the portions corresponding to flange having a different shape from that of the flange portions 7 of the target shape.

Figure 13:
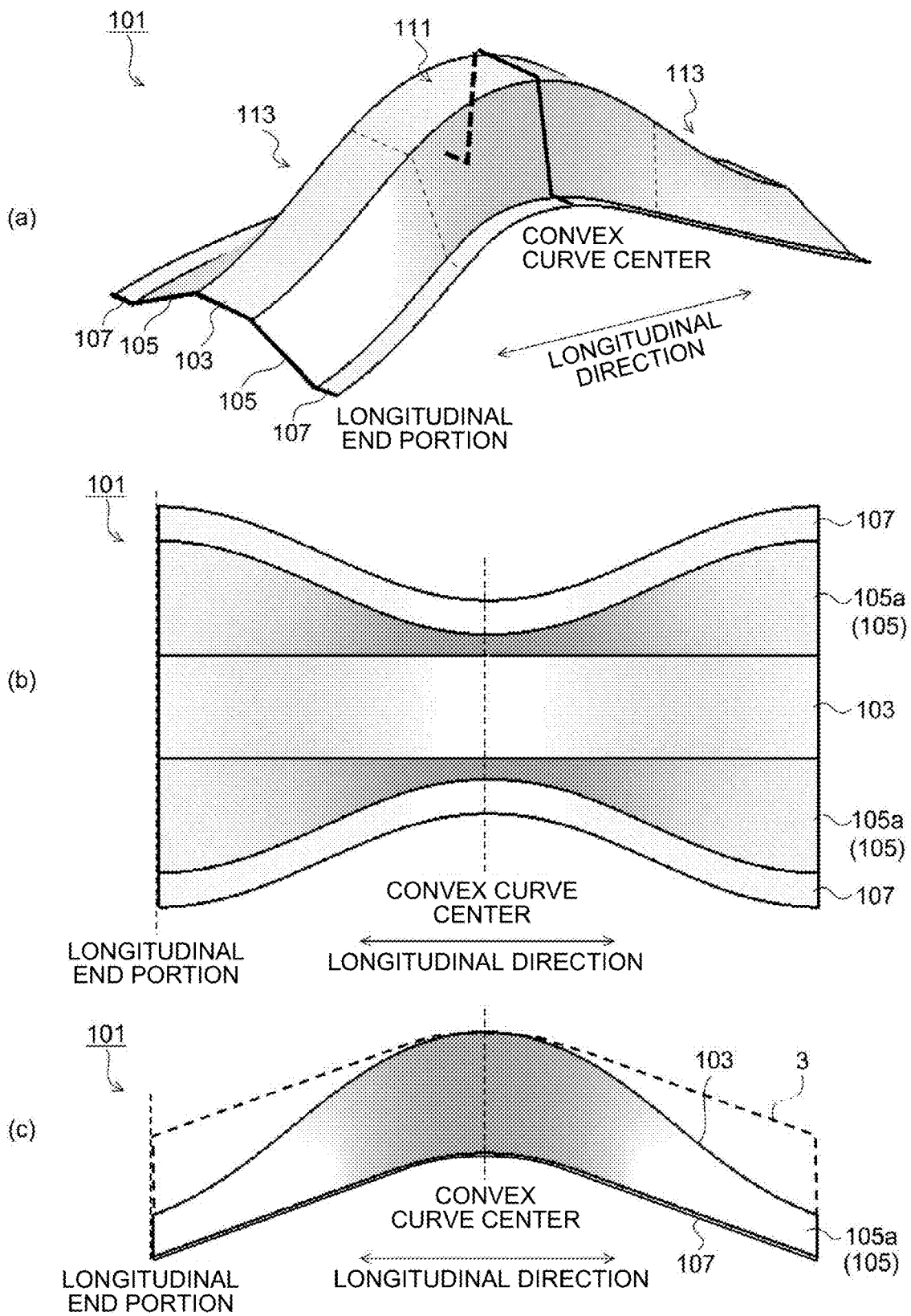
FIG. 13 illustrates another example of the preformed part that is press-formed by the press forming method according to the embodiment of the present invention ((a) perspective view, (b) top view, (c) side view).

However, the present invention may form portions 107 corresponding to flange having the same shape as that of the flange portions 7 of the target shape (FIG. 2), and may form a portion 103 corresponding to web having a different shape from that of the web portion 3 of the target shape, as in a preformed part 101 illustrated in FIG. 13.

In the preformed part 101 as described above, when the angle $\Theta_2$ between each of twisted side wall portions 105a and the portion 103 corresponding to web at the longitudinal end portion is larger than the angle $\theta_1$ between the twisted side wall portion 105a and the portion 103 corresponding to web at the convex curve center, the twisted side wall portion 105a formed in each of portions 105 corresponding to side wall is press-formed while undergoing in-plane shear deformation as illustrated in FIG. 7. Thus, both fractures in the web portion 3 and wrinkles in the flange portion 7 can be suppressed in the press-formed product 1, which is obtained by press-forming the preformed part 101 into the target shape.

However, as illustrated in FIG. 6, when the portion 23 corresponding to web of the preformed part 21 has the same shape as that of the web portion 3 of the target shape, press forming can be performed stably without any wobble when the preformed part 21 is placed on a punch of the die used at the second forming process. Thus, it is preferable to form the preformed part 21 including the portion 23 corresponding to web having the same shape as that of the web portion 3 of the target shape.

Figure 14:
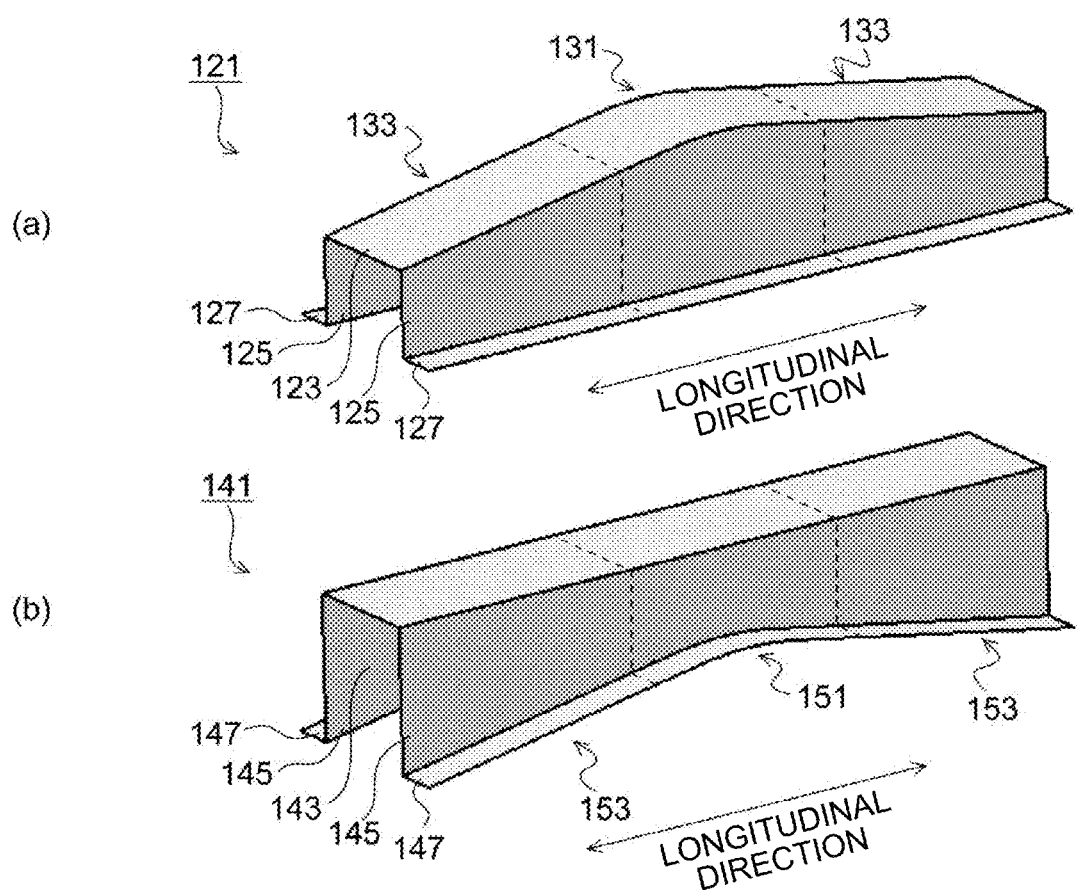
FIG. 14 illustrates other examples of the press-formed product to be formed in the present invention ((a) the web portion alone is convexly curved, (b) the flange portions alone are convexly curved).

Furthermore, the press-formed product 1 to be formed as described above includes the web portion 3 and the flange portion 7 both being convexly curved in the height direction along the longitudinal direction. However, as illustrated in FIG. 14, the present invention may be used to form a press-formed product 121 in which a web portion 123 alone is convexly curved or a press-formed product 141 in which a flange portion 147 alone is convexly curved.

The above explanation is for forming a press-formed product such as the press-formed product 1 illustrated in FIG. 2 in which the radius of curvature of the convex curved portion 11 is constant in the longitudinal direction. However, the present invention may be used to form a press-formed product that has a plurality of consecutive convex curved portions with different radii of curvature.

In such a case, for each convex curved portion with a constant radius of curvature, the twisted side wall portion in the convex curved portion may have a curved surface shape twisted from the center toward the end portion of the convex curved portion in the longitudinal direction. Then, for each convex curved portion, the angle between the portion corresponding to web and the twisted side wall portion at the longitudinal end portion of the twisted side wall portion of the convex curved portion may be larger than that at the center of the convex curved portion in the longitudinal direction.

In addition, the press-formed product 1 to be formed in the present embodiment includes the straight portions 13 on both sides of the convex curved portion 11 in the longitudinal direction. However, the present invention may be used to form a press-formed product including a straight portion on one side of the convex curved portion in the longitudinal direction or a press-formed product including the convex curved portion alone.

Furthermore, in the press-formed product 1 illustrated in FIG. 2, the angle between the web portion 3 and the side wall portion 5 is constant along the longitudinal direction, that is, as illustrated in FIG. 3, the angle $\theta_{1,0}$ at the convex curve center of the press-formed product 1 (the center of the convex curved portion 11 in the longitudinal direction) and the angle $\theta_{2,0}$ at the longitudinal end portion (the end portion of the side wall portion 5 in the longitudinal direction) are equal. However, the present invention may be used to form a press-formed product in which the angle between the web portion and the side wall portion changes along the longitudinal direction, that is, the side wall portion has a curved surface shape twisted along the longitudinal direction.

In such a case, the angle difference between the angle at the end portion of the twisted side wall portion in the longitudinal direction and the angle at the center of the portion corresponding to convex curve in the longitudinal direction in the preformed part may be made larger than the angle difference between the angle at the center of the convex curved portion in the longitudinal direction (convex curve center) and the angle at the end portion of the side wall portion in the longitudinal direction (longitudinal end portion) in the press-formed product of the target shape, so that the twisted side wall portion of the preformed part may have a curved surface shape more twisted along the longitudinal direction than that of the side wall portion of the target shape.

For example, the angle between the portion corresponding to web and the twisted side wall portion at the convex curve center of the preformed part may be the angle between the web portion and the side wall portion at the convex curve center of the target shape, and the angle between the portion corresponding to web and the twisted side wall portion at the longitudinal end portion of the preformed part may be larger than the angle between the web portion and the side wall portion at the longitudinal end of the target shape.

«Regarding Pressing Technique»

Figure 15:
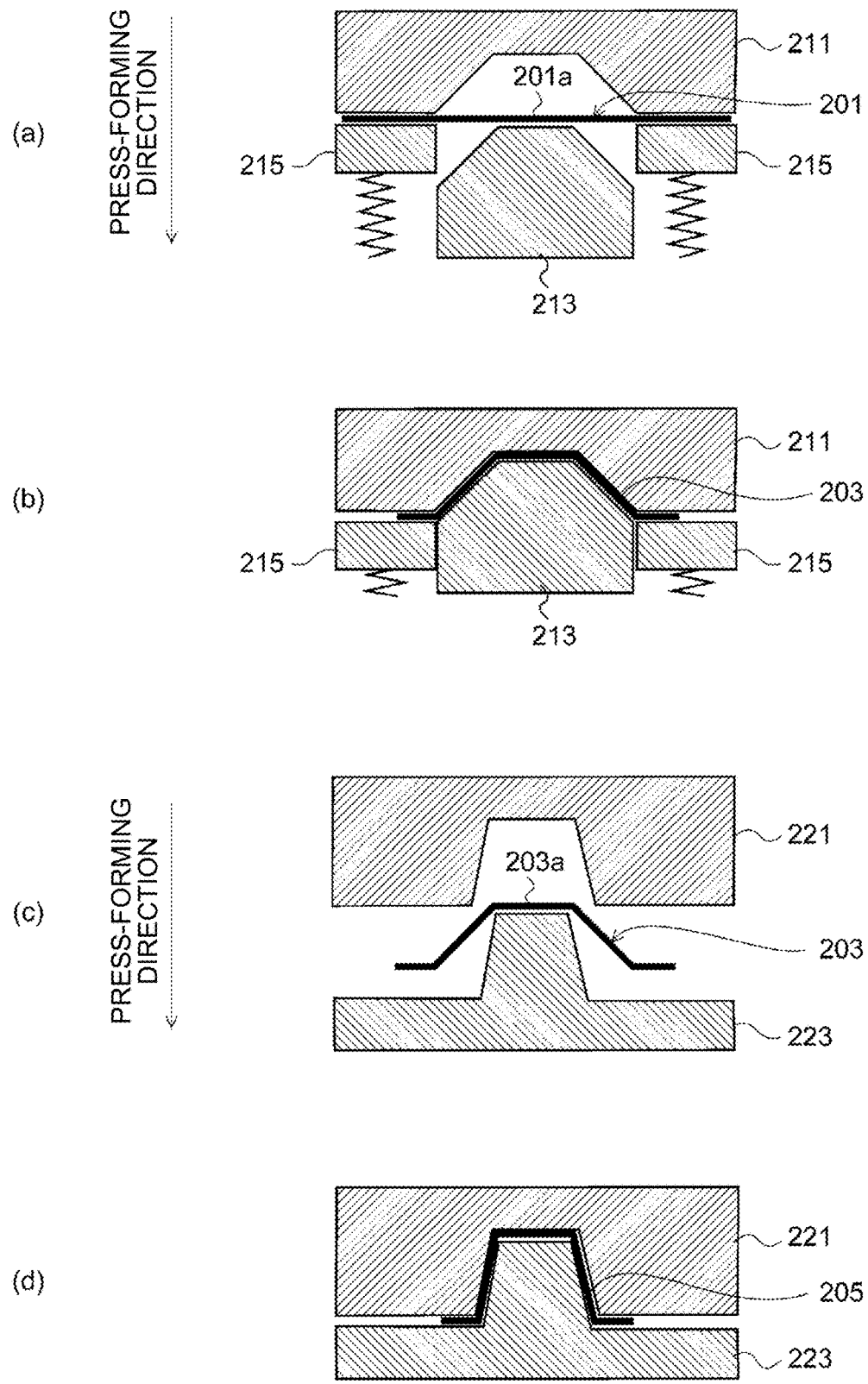
FIG. 15 illustrates drawing forming and crash forming applied in the press forming method according to the embodiment of the present invention ((a), (b) drawing forming, (c), (d) crash forming).

Even when the twisted side wall portion 25a is formed at the first forming process to produce in-plane shear deformation as described above, the portion 27 corresponding to flange may undergo compressive deformation and wrinkles may occur. In such a case, drawing forming is desirable for the first forming process, in which the blank 201 is press-formed with its end portions being clamped with blank holders 215 and a die 211 as illustrated in FIGS. 15(a) and 15(b). On the other hand, at the second forming process, the preformed part 203 is bent at each punch corner portion 24 between the portion 23 corresponding to web and the portion 25 corresponding to side wall, and the twisted side wall portion of the preformed part 203 is formed into the side wall portion of the target shape. Thus, crash forming may be employed for the second forming process, in which the preformed part 203 is press-formed by being sandwiched between a die 221 and a punch 223 as illustrated in FIGS. 15(c) and 15(d). However, if wrinkle occurrence is also a concern for a flange portion of a press-formed product 205 to be press-formed at the second forming process, drawing forming may be used at the second forming process.

In the drawing forming and the crash forming, a pad (not illustrated) that is paired with a punch 213 (FIGS. 15(a) and 15(b)) or the punch 223 (FIGS. 15(c) and 15(d)) may be inserted on the die 211 side (FIGS. 15(a) and 15(b)) or the die 221 side (FIGS. 15(c) and 15(d)), and a part 201a (refer to FIG. 15(a)) in the blank 201 corresponding to a portion 203a corresponding to web of the preformed part 203 at the first forming process, or the portion 203a corresponding to web (refer to FIG. 15(c)) of the preformed part 203 at the second forming process, may be pressed down with the pad while being forming.

EXAMPLES

Specific press forming experiments were conducted on the operation and effect of the press forming method according to the present invention, and are described below.

In the press forming experiments, as illustrated in FIG. 2, the press-formed product 1 having a hat-shaped cross section with the web portion 3, the side wall portions 5, and the flange portions, and including the convex curved portion 11 in which the web portion 3 and each of the flange portions 7 are convexly curved in the height direction along the longitudinal direction in side view, and the straight portions 13 extending on both sides of the convex curved portion 11 in the longitudinal direction, was to be formed.

Figure 16:
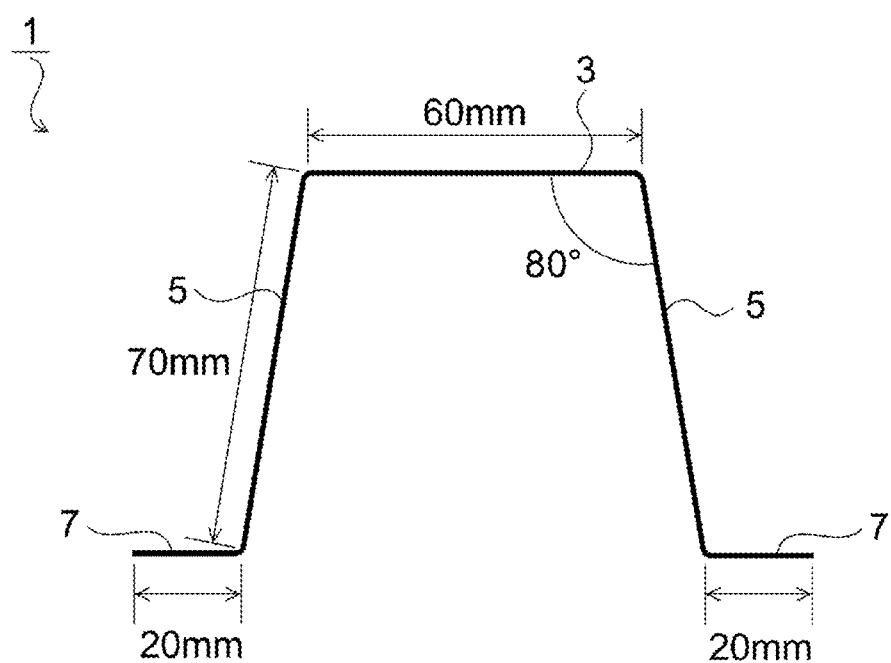
FIG. 16 illustrates the shape of a section of a press-formed product to be formed in the present examples, the section being perpendicular to the longitudinal direction.

The dimensions of the press-formed product 1 were as illustrated in FIG. 16: the width of the web portion 3 was 60 mm, the side wall height of the side wall portion 5 was 70 mm, the width of the flange portion 7 was 20 mm, and the angle between the web portion 3 and the side wall portion 5 was 80°. Furthermore, the longitudinal length was 385 mm, the radius of curvature of the curve in the convex curved portion 11 was R150 mm, and the angle $\theta_0$ on the acute side of the angle between the web portion 3 and the press-forming direction at the portion 33 corresponding to straight portion in side view was 70°. The material used for press forming in the experiments was a steel sheet with a thickness of 1.2 mm and a tensile strength of 1180 MPa.

The pressing technique used at the first forming process was drawing forming (refer to FIGS. 15(a) and 15(b)), and the pressing technique used at the second forming process was crash forming (refer to FIGS. 15(c) and 15(d)). At the first process, a blank holder load was set to 20 tonf.

At the first forming process, as illustrated in FIG. 6, the preformed part 21 is press-formed, in which the portion 23 corresponding to web, the portions 25 corresponding to side wall including the twisted side wall portions 25a of a twisted shape along the longitudinal direction, and the portions 27 corresponding to flange are formed, the preformed part 21 including the portion 31 corresponding to convex curve. Here, the twisted side wall portion 25a has the longitudinal length L of 250 mm and the side wall height H of 70 mm (refer to FIG. 8).

Figure 17:
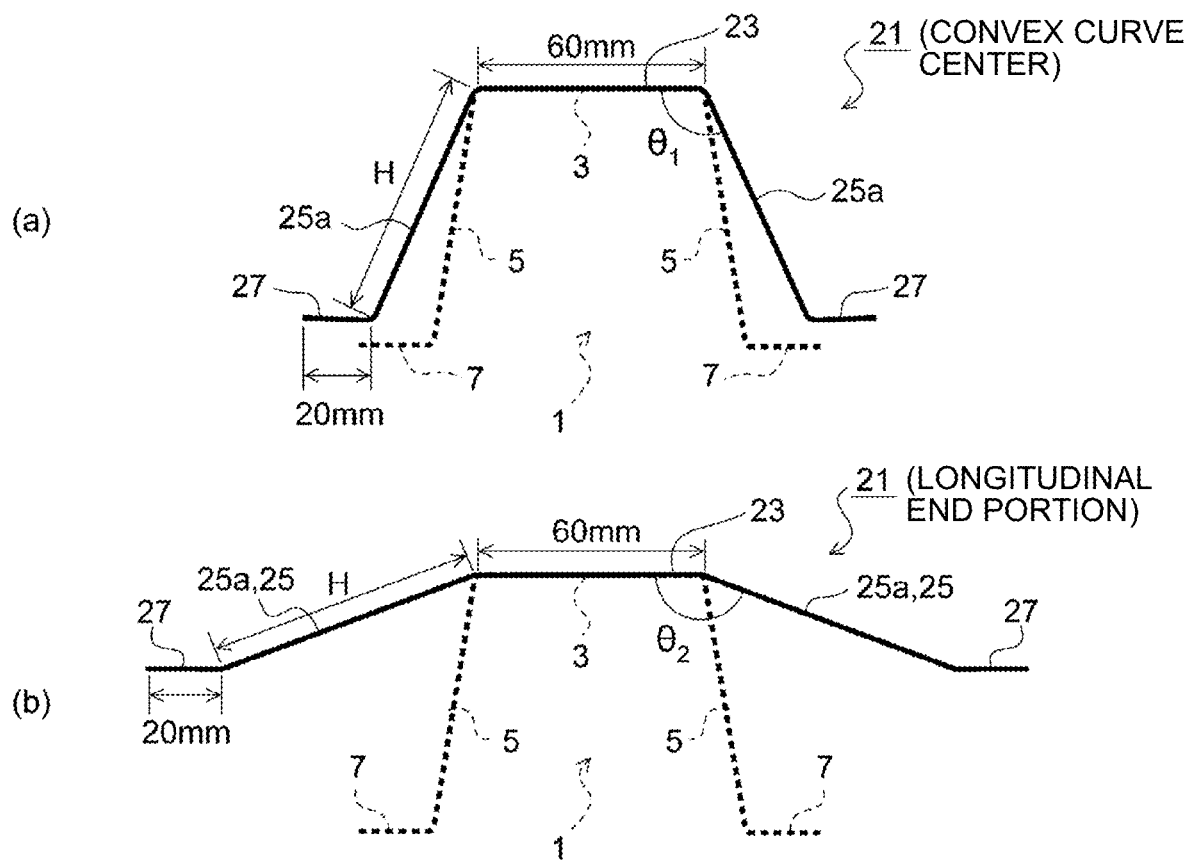
FIG. 17 illustrates the shapes of sections of a preformed part that is press-formed in the present examples, the sections being perpendicular to the longitudinal direction of a twisted side wall portion of the preformed part ((a) convex curve center, (b) longitudinal end portion).

FIG. 17 illustrates the shapes of sections of the preformed part 21. In the present examples, inventive examples were set to have the angle $\theta_2$ between the portion 23 corresponding to web and the twisted side wall portion 25a at the longitudinal end portion (FIG. 17(b)) is larger than the angle $\theta_1$ between the portion 23 corresponding to web and the twisted side wall portion 25a at the center of the portion 31 corresponding to convex curve in the longitudinal direction (FIG. 17(a)). These two angles $\theta_1$ and $\theta_2$, the angle difference $\Delta\theta$ $(=\theta_2-\theta_1)$ were changed to different values, and the preformed part 21 was press-formed at the first forming process and press-formed into the press-formed product 1 having the target shape at the second forming process. The press formability was then evaluated by the presence of fractures and wrinkles in the press-formed product 1.

For the evaluation of fractures, "x" indicates that fractures are present, "Δ" indicates that fractures are not present but necking due to thickness reduction is present, and "o" indicates that no fracture or necking is present at all. For the evaluation of wrinkles, "x" indicates that remarkable wrinkles are present, and "Δ" indicates that minute wrinkles are present, and "o" indicates that no wrinkle is present at all.

In the present examples, conventional examples were set to include an example in which the press-formed product 1 is press-formed in one process of crash forming or drawing forming, and an example in which the press-formed product 1 is press-formed in two processes of the first forming process and the second forming process, and the portion 25 corresponding to side wall of the preformed part 21 press-formed at the first forming process does not have a curved surface shape twisted along the longitudinal direction.

Furthermore, comparative examples were set to include an example in which the press-formed product 1 is press-formed in two processes of the first forming process and the second forming process, and the angles $\theta_1$ and $\theta_2$ between the portion 23 corresponding to web and the twisted side wall portion 25a of the preformed part 21 press-formed at the first forming process are outside the scope of the present invention.

Then, the press-formed products according to the conventional examples and the comparative examples were evaluated for the presence of fractures and wrinkles in the same manner as the inventive examples. Table 1 presents the press forming conditions and the evaluation results of press formability.

TABLE 1

| | Twisted side wall shape | | | | | | Press formability Evaluation | |
|---|---|---|---|---|---|---|---|---|
| | Angle difference $\Delta\theta$ (°) | Convex curve center angle $\theta_1$ (°) | Longitudinal end portion angle $\theta_2$ (°) | Longitudinal length L (mm) | Side wall height H (mm) | Torsion amount T (°) | Fractures in web portion | Wrinkles in flange portion |
| Inventive Example 1 | 20 | 100 | 120 | 250 | 70 | 5.6 | △ | ○ |
| Inventive Example 2 | 20 | 120 | 140 | 250 | 70 | 5.6 | △ | ○ |
| Inventive Example 3 | 20 | 140 | 160 | 250 | 70 | 5.6 | △ | △ |
| Inventive Example 4 | 20 | 160 | 180 | 250 | 70 | 5.6 | ○ | △ |
| Inventive Example 5 | 40 | 100 | 140 | 250 | 70 | 11.2 | ○ | ○ |
| Inventive Example 6 | 40 | 120 | 160 | 250 | 70 | 11.2 | ○ | ○ |
| Inventive Example 7 | 40 | 140 | 180 | 250 | 70 | 11.2 | ○ | ○ |
| Inventive Example 8 | 60 | 100 | 160 | 250 | 70 | 16.8 | ○ | ○ |
| Inventive Example 9 | 60 | 120 | 180 | 250 | 70 | 16.8 | ○ | ○ |
| Inventive Example 10 | 80 | 100 | 180 | 250 | 70 | 22.4 | ○ | △ |
| Inventive Example 11 | 45 | 95 | 140 | 250 | 70 | 12.6 | ○ | ○ |
| Inventive Example 12 | 60 | 100 | 160 | 125 | 70 | 33.6 | △ | △ |
| Inventive Example 13 | 60 | 100 | 160 | 250 | 35 | 8.4 | ○ | △ |
| Conventional Example 1 | — | — | — | — | — | — | ○ | X |
| Conventional Example 2 | — | — | — | — | — | — | X | ○ |
| Conventional Example 3 | 0 | 120 | 120 | 250 | 70 | 0.0 | X | ○ |
| Conventional Example 4 | 0 | 140 | 140 | 250 | 70 | 0.0 | △ | X |
| Conventional Example 5 | 0 | 160 | 160 | 250 | 70 | 0.0 | ○ | X |
| Comparative Example 1 | −5 | 100 | 95 | 250 | 70 | −1.4 | X | ○ |
| Comparative Example 2 | −20 | 120 | 100 | 250 | 70 | −5.6 | X | X |
| Comparative Example 3 | −20 | 140 | 120 | 250 | 70 | −5.6 | △ | X |
| Comparative Example 4 | −20 | 160 | 140 | 250 | 70 | −5.6 | △ | X |

In Table 1, the convex curve center angle $\theta_1$ is the angle between the portion 23 corresponding to web and the twisted side wall portion 25a at the center of the portion 31 corresponding to convex curve of the preformed part 21 in the longitudinal direction (FIG. 17(a)), and the longitudinal end portion angle $\theta_2$ is the angle between the portion 23 corresponding to web and the twisted side wall portion 25a (or the portion 25 corresponding to side wall) at the end portion of the twisted side wall portion 25a in the longitudinal direction (FIG. 17(b)). The angle difference $\Delta\theta$, the longitudinal length L, and the side wall height H are given in the same manner as in the embodiment described above, and the torsion amount T is calculated by substituting the angle difference $\Delta\theta$, the longitudinal length L, and the side wall height H into Equation (1) described above.

In Table 1, Conventional Examples 3 to 5, Comparative Examples 2 to 4, and Inventive Examples 1 to 13 are presented by being grouped by condition with the same angle difference $\Delta\theta$. In Conventional Example 1, the press-formed product 1 was press-formed in one process of crash forming. In Conventional Example 2, the press-formed product 1 was formed in one process of drawing forming, and the angle between the web portion 3 and the side wall portion 5 is 100°, which is the target shape.

In Conventional Example 1, occurrence of fractures was not observed in the web portion 3, but wrinkles occurred in the flange portion 7. In Conventional Example 2, occurrence of wrinkles was not observed in the flange portion 7, but fractures occurred in the web portion 3.

In Conventional Examples 3 to 5, the angle difference $\Delta\theta$ between the convex curve center angle $\theta_1$ and the longitudinal end portion angle $\theta_2$ is zero, and thus press-forming of the preformed part 21 by giving in-plane shear deformation to the portion 25 corresponding to side wall was not possible. Thus, in the press-formed product 1 obtained by press-forming the preformed part 21 into the target shape, a line length difference in the longitudinal direction was generated between the web portion 3 and the flange portion 7, and both fractures in the web portion 3 and wrinkles in the flange portion 7 could not be suppressed at the same time.

In each of Comparative Examples 1 to 4, the longitudinal end portion angle $\theta_2$ is smaller than the convex curve center angle $\theta_1$, and the angle difference $\Delta\theta$ is a negative value. Thus, while the angle difference $\Delta\theta$ between the convex curve center angle $\theta_1$ and the longitudinal end portion angle $\theta_2$ is not zero, and the twisted side wall portion 25a was formed under in-plane shear deformation at the first forming process, the direction of the in-plane shear deformation is opposite to the direction of the shear deformation in the twisted side wall portion according to the present invention (refer to FIG. 12), and thus the line length difference in the longitudinal direction between the portion 23 corresponding to web and the portion 27 corresponding to flange did not decrease. As a result, both fractures in the web portion 3 and wrinkles in the flange portion 7 could not be suppressed at the same time in the press-formed product 1 having the target shape.

In each of Inventive Examples 1 to 13, the longitudinal end portion angle $\theta_2$ is larger than the convex curve center angle $\theta_1$, resulting in the angle difference $\Delta\theta$ being a positive value, and the convex curve center angle $\theta_1$, the longitudinal end portion angle $\theta_2$, and the longitudinal length L and the side wall height H of the twisted side wall portion 25a are changed.

Table 1 presents that a press-formed product was able to be press-formed while suppressing both fractures and wrinkles at the same time in all of Inventive Examples 1 to 4 ($\Delta\theta=20°$), Inventive Examples 5 to 7 ($\Delta\theta=40°$), Inventive Examples 8 and 9 ($\Delta\theta=60°$), Inventive Example 10 ($\Delta\theta=80°$), Inventive Example 11 ($\theta_1=95°$) in which the convex curve center angle $\theta_1$ is smaller than the angle (=100°) between the web portion 3 and the side wall portion 5 of the target shape, and Inventive Example 12 (L=125 mm) and Inventive Example 13 (H=35 mm) in which the longitudinal length L and the side wall height H of the twisted side wall portion 25a are changed.

It is considered that these results were obtained because, in the preformed part 21 according to each of Inventive Examples 1 to 13, the twisted side wall portion 25a was formed under in-plane shear deformation as illustrated in FIG. 7 above, and thus the line length difference in the longitudinal direction between the web portion 3 and the flange portion 7 was reduced. Furthermore, in each of Inventive Examples 5 to 7 (T=11.2°), Inventive Examples 8 and 9 (T=16.8°), and Inventive Example 11 (T=12.6°) in which the torsion amount T is within the suitable range of the present invention (10° or larger and 20° or smaller), no occurrence of fractures or wrinkles was observed at all in the press-formed product 1 and favorable results were obtained.

In summary, it has been demonstrated that the press forming method according to the present invention enables press forming of a press-formed product having a hat-shaped cross section, the press-formed product being convexly curved in the height direction along the longitudinal direction in side view, while suppressing both fractures and wrinkles.

INDUSTRIAL APPLICABILITY

According to the present invention, a press forming method can be provided that can press-form, into a favorable shape, a press-formed product having a hat-shaped cross section with a web portion, a side wall portion, and a flange portion, the press-formed product being convexly curved in the height direction along the longitudinal direction, while suppressing fractures and wrinkles.

REFERENCE SIGNS LIST 1 press-formed product
3 web portion
4 punch corner portion
5 side wall portion
6 die corner portion
7 flange portion
11 convex curved portion
13 straight portion
21 preformed part
23 portion corresponding to web
24 punch corner portion
25 portion corresponding to side wall
25a twisted side wall portion
26 die corner portion
27 portion corresponding to flange
31 portion corresponding to convex curve
33 portion corresponding to straight portion
41 preformed part
43 portion corresponding to web
45 portion corresponding to side wall
45a twisted side wall portion
47 flange portion
51 portion corresponding to convex curve
53 portion corresponding to straight portion
61 preformed part
63 portion corresponding to web
65 portion corresponding to side wall
65a twisted side wall portion
67 flange portion
71 portion corresponding to convex curve
73 portion corresponding to straight portion
81 preformed part
83 portion corresponding to web
85 portion corresponding to side wall
85a twisted side wall portion
87 flange portion
91 portion corresponding to convex curve
93 portion corresponding to straight portion
101 preformed part
103 portion corresponding to web
105 portion corresponding to side wall
105a twisted side wall portion
107 portion corresponding to flange
111 portion corresponding to convex curve
113 portion corresponding to straight portion
121 press-formed product
123 web portion
125 side wall portion
127 flange portion
131 convex curved portion
133 straight portion
141 press-formed product
143 web portion
145 side wall portion
147 flange portion
151 convex curved portion
153 straight portion
201 blank
201a portion
203 preformed part
203a portion corresponding to web
205 press-formed product
211 die
213 punch
215 blank holder
221 die
223 punch

The invention claimed is:

1. A press forming method of forming a press-formed product including: a web portion; a side wall portion continuous from the web portion; a flange portion continuous from the side wall portion; and a convex curved portion in which the web portion and/or the flange portion is convexly curved in a height direction along a longitudinal direction in side view, wherein a center of a convexly curved arc is located on the flange portion side in side view, the press forming method comprising:

a first forming process of press-forming a blank into a preformed part in which a portion corresponding to a web, and a portion corresponding to a side wall including a twisted side wall portion of a twisted shape along the longitudinal direction, are formed, the preformed part including a portion corresponding to a convex curve; and a second forming process of press-forming the preformed part into the press-formed product, wherein the twisted side wall portion of the preformed part press-formed by the first forming process is twisted such that an angle between the twisted side wall portion and the portion corresponding to the web is larger on an end portion side than at a center of the portion corresponding to the convex curve in the longitudinal direction, the angle being measured from below the portion corresponding to the web.

2. The press forming method according to claim 1, wherein the twisted side wall portion of the preformed part press-formed by the first forming process has a torsion amount T given by a following equation, the torsion amount T being set to be in a range of 10° or larger and 20° or smaller:

$T = \Delta\theta \times (H/L)$, where
- $\Delta\theta$: an angle difference ($=\theta_2-\theta_1$),
- $\theta_1$: an angle (°) between the twisted side wall portion and the portion corresponding to the web at the center of the portion corresponding to the convex curve in the longitudinal direction,
- $\theta_2$: an angle (°) between the twisted side wall portion and the portion corresponding to the web at an end portion of the twisted side wall portion in the longitudinal direction,
- H: a side wall height (mm) of the twisted side wall portion, and
- L: a longitudinal length (mm) of the twisted side wall portion.

* * * * *